Figure 1:
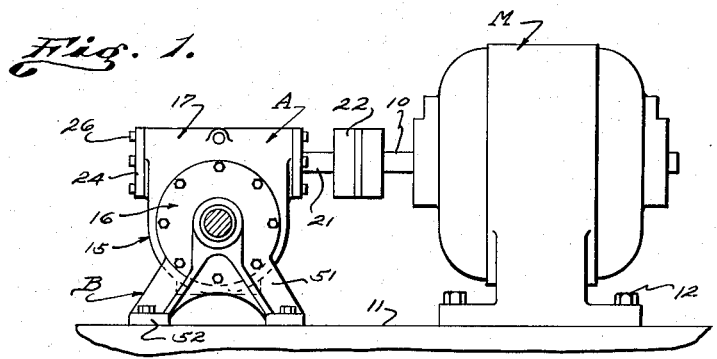

Nov. 3, 1953 H. F. KAELIN 2,657,591
POWER TRANSMITTING MECHANISM
Filed April 13, 1950

INVENTOR.
Henry Frank Kaelin
BY
Attorney

Patented Nov. 3, 1953

2,657,591

UNITED STATES PATENT OFFICE 2,657,591

POWER TRANSMITTING MECHANISM

Henry Frank Kaelin, Los Angeles, Calif.

Application April 13, 1950, Serial No. 155,645

8 Claims. (Cl. 74—606)

This invention has to do with a power transmitting machine, preferably a speed reducing mechanism, and it is a general object of the invention to provide a simple, practical, dependable mechanism receiving power from a drive shaft having a fixed axis and delivering such power through a driven shaft which is angularly related to the drive shaft and which is supported by bearings in mountings applicable to supports which are at various angles or are in various positions relative to the drive shaft. It is common to provide power transmission mechanisms to be mounted on a base adjacent a prime mover or motor so that the mechanism and motor have, in effect, a common support. It is also common to provide mechanisms wherein motors and transmission mechanisms are combined in a rigid unit having a single or common mounting.

It is a general object of this invention to provide a simple, practical and dependable mechanism involving a motor and a drive such as a speed reducing drive, which motor and drive have separate mountings such that the supports to which these elements are applied may be at various angles or in different positions relative to each other. Through the present invention dual support is gained, that is, the motor or prime mover is effectively supported and the drive is effectively supported, and these supports may be spaced apart and at various angles relative to each other.

Another object of this invention is to provide a structure of the general character referred to in which a case is formed by a shell and heads applicable to the shell in various positions, the case serving as a mounting or carrier for a driven shaft while the heads carry a drive shaft and have projections by which the structure may be mounted.

A further object of the present invention is to provide a structure that can be mounted in various manners as hereinabove pointed out, and which involves but few simple inexpensive parts that are very simple and convenient to mount or assemble.

The present invention contemplates provision of a prime mover or motor fixed on a support so the motor shaft has a fixed axis. A power transmitting mechanism is operated by the motor and involves a shell with a lateral projection carrying spaced bearings that support a driven shaft. One end of the driven shaft projects from the shell and is coupled to the motor shaft in line therewith. Heads, preferably disc-shaped, are engaged with the ends of the shell and serve to close the shell. The heads carry bearings which support a driven shaft so that it has a portion within the case formed by the shell and heads and a power take-off portion projecting from the outer side of one of the heads. Releasable fasteners secure the heads to the ends of the shell in various rotative positions thereon, the fasteners being preferably circumferentially spaced screw fasteners. Legs project from the heads, preferably from the peripheral portions thereof, and have feet engageable with a support parallel with that carrying the motor or angularly related thereto. By rotating or varying the rotative positions of the heads relative to the case the legs that carry the heads may be arranged at various angles relative to the motor and its support, as circumstances may require. A worm gear is carried on the driven shaft within the shell and a worm wheel is provided on the drive shaft within the shell and is driven by the gear.

Figure 2:
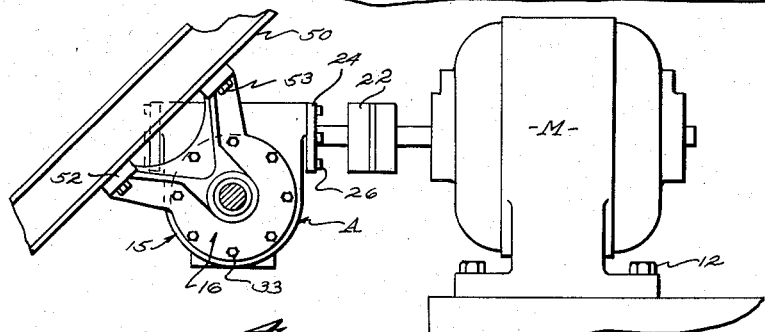
Figures 3, 4:
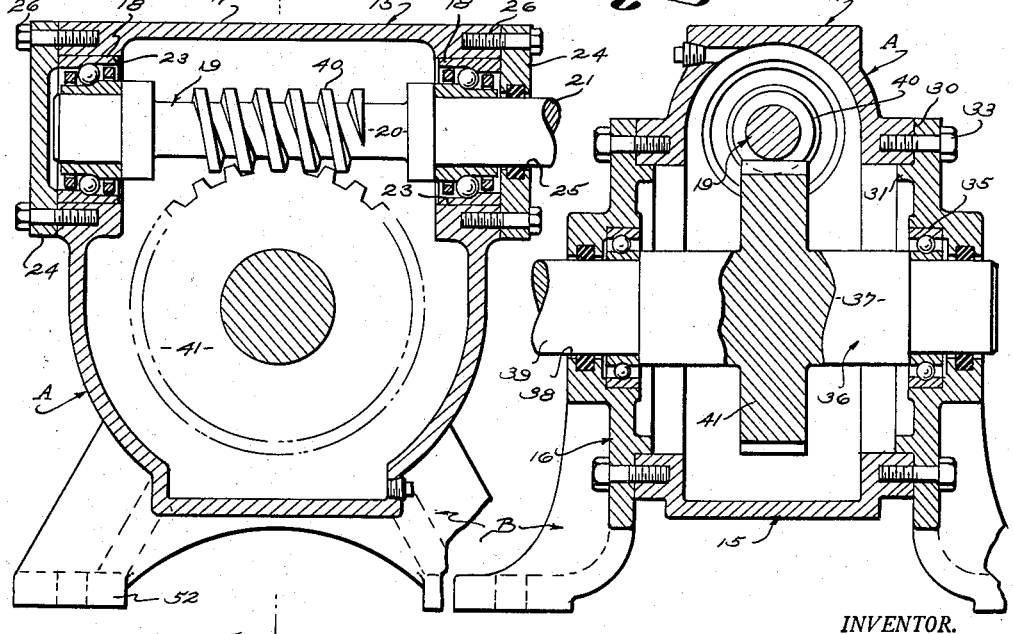

The various objects and features of my invention will be fully understood from the following detailed description of a typical preferred form and application of the invention, throughout which description reference is made to the accompanying drawings, in which:

Fig. 1 is a side elevation of a mechanism embodying the present invention showing the parts arranged with the motor and the power transmitting mechanism supported on a single base or in a common plane. Fig. 2 is a view of the mechanism shown in Fig. 1, showing the motor and power transmitting unit carried by different supports which are angularly related to each other. Fig. 3 is an enlarged longitudinal sectional view of the power transmitting mechanism and Fig. 4 is a transverse sectional view of the mechanism shown in Fig. 3 being a view taken as indicated by line 4—4 on Fig. 3.

A mechanism embodying the present invention may involve, generally, a prime mover such as a motor M having a projecting shaft 10, a power transmitting mechanism A operated by or from the motor shaft, and mounting means B supporting the mechanism A.

In the typical form of the invention illustrated in the drawings the motor M is shown rigidly fixed or attached to a horizontal support 11 as by fasteners 12, so that the motor shaft 10 is horizontally disposed. A feature of the present invention resides in the fact that the motor M may be of any suitable form, type, size, or class in that it is merely operatively joined to the drive mechanism by means of shifting the motor shaft 10 forming the sole connection between the drive mechanism and the motor.

The drive mechanism A illustrated in the drawings involves, generally, a case made up of a shell 15 and heads 16 applied to the ends of the shell. The shell 15 has a laterally projecting portion 17 carrying spaced bearings 18 which support a driven shaft 19. The shaft 19 is supported by the bearings 18 so that it has a portion 20 within the shell and a power receiving end portion 21 projecting from the exterior of the shell. The portion 21 of shaft 19 is connected to the motor shaft 10 by a suitable coupling 22. In the particular case illustrated the bearings 18 are mounted in bores 23 provided in the lateral extension 17 of the shell and caps 24 are provided on the exterior of the extension 17 confining the bearings to the bores. One of the caps is shown as solid or imperforate, while the other has an opening 25 passing the shaft 19. Suitable sealing or packing means may be provided where the shaft 19 passes through the last mentioned cap. The caps 24 are shown secured to the extension 17 by screw fasteners 26 in the form of screws engaged in sockets provided in the shell portion 17 which sockets terminate so that they do not enter the interior of the shell.

The shell 15 hereinabove referred to is provided with concentric ends 30 in spaced parallel planes and the heads 16 are preferably round or disc-like plates which engage the ends 30 of the shell. In the preferred construction annular guide ribs 31 concentric with the heads project from the inner sides of the heads to center the heads relative to the ends of the shell. The present invention provides means fastening the heads to the ends of the shell so the heads can be arranged or rotated to various positions on the ends of the shell. In the form of the invention illustrated screw fasteners 33 connect the heads to the ends of the shell, the screw members being centered in sockets in the end portions of the shell which sockets terminate without entering the interior of the shell.

The heads 16 support or carry bearings 35 centrally of the heads and the bearings 35 carry the driven shaft 36. The shaft 36 in the case illustrated has an inner portion 37 extending between the heads and through the interior of the shell. The end portions of the shaft 36 project through openings 38 in the heads where packing means or seals are provided around the shaft. One end portion 39 of the shaft 36 projects a substantial distance from the case construction just described, forming a part from which power can be advantageously taken from the mechanism.

A suitable drive is provided between the shafts 19 and 36. In the particular case illustrated a worm gear 40 is formed or provided on the portion 20 or driven shaft 19 and meshes with and drives a worm wheel 41 provided or formed on the portion 37 of shaft 36. Through the mechanism just described a substantial speed reduction is gained between shafts 19 and 36.

The present invention provides the mounting means B whereby the drive mechanism A above described may be mounted on or from a suitable support, if necessary independently of the support that carries the motor M. In Fig. 1 of the drawings the support or means B is shown carrying the drive A on the same support that carries the motor M, whereas in Fig. 2 it is shown carrying the mechanism A on an entirely separate and different support 50. The means or support B illustrated in the drawings involves legs 51 projecting from the heads 16 and the particular legs illustrated have feet or mounting flanges 52 that can be made fast to a suitable support, as by fasteners 53. In the particular case shown there are two spaced legs on each head and the feet of such legs are in a common plane so they are readily applicable to a flat support.

In accordance with the present invention the fasteners 33, which may be screw members as shown throughout the drawings, are circumferentially spaced around the heads and the ends of the shell so that by suitably selecting the rotative positioning of the heads on the ends of the shell the legs can be arranged to project in various directions, as for instance, in directions such as are shown in Figs. 1 and 2 of the drawings. It will be apparent that if the fasteners 33 are equally spaced around the heads and if a substantial number of fasteners is provided, a very wide range of adjustment can be obtained. Further, it is to be observed that through the construction provided by the present invention the driven shaft 36 from which power is derived, is supported by means of the heads applicable to a support 50, which support may be entirely independent of the motor support and may be a structure carrying parts or mechanism operated by a shaft 36. Through such construction satisfactory alignment can be easily obtained between the driven shaft 16 and the mechanism operated thereby. Further, through the construction provided by the present invention it is possible to mount the drive mechanism through the means B on a support at any angle, while the motor M is mounted on a horizontal support to be in a position or to operate under conditions which are most advantageous.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A power transmission of the character described including, a stationary shell, a drive shaft rotatably supported by the shell with a portion within the shell and a power receiving end portion projecting from the exterior of the shell, a driven shaft, supporting means for the driven shaft including, heads applicable to the shell and rotatably supporting the driven shaft with a portion within the shell and a portion projecting from the assembly of the shell and heads, means releasably securing the heads to the shell, and projections on the heads applicable to a support, the heads being applicable to the shell to be held by the last mentioned means in various positions about the axis of the driven shaft to vary the direction in which the projections project from said assembly, and a drive between the shafts and located wholly within said assembly.

2. A power transmission of the character described including, a stationary annular shell with oppositely facing ends and a lateral extension carrying spaced bearings, a drive shaft rotatably supported by the said bearings of the shell with a portion within the shell and a power receiving end portion projecting from the exterior of the shell, a driven shaft, supporting means for the driven shaft including, heads engageable with the ends of the shell and rotatably supporting the driven shaft with a portion within the shell and a portion projecting from the assembly of the shell and heads, fastening means releasably fixing the heads to the ends of the shell, and projections on the heads applicable to a support, the heads being applicable to the shell in various positions about the axis of the driven shaft to close its said ends and to vary the direction in which the projections project from said assembly, and a drive between the shafts and located wholly within said assembly.

3. A power transmission of the character described including, a shell having like oppositely facing ends, a drive shaft supported by the shell with a portion within the shell and a power receiving end portion projecting from the exterior of the shell, a driven shaft, said shell and said drive shaft being stationary, supporting means for the driven shaft including, like disc-shaped heads engaged with the ends of the shell and supporting the driven shaft with a portion within the shell and a portion projecting from the assembly of the shell and heads, circumferentially spaced screw fasteners releasably fastening the heads to the ends of the shell, and projections on the heads applicable to a support, the heads being applicable to the shell in various rotative positions relative to the axis of the driven shaft to close its said ends and to vary the direction in which the projections project from said assembly, and a drive between the shafts and located wholly within said assembly.

4. A power transmission of the character described including, an annular shell with round concentric oppositely facing open ends in spaced parallel planes, spaced bearings carried by the peripheral portion of the shell, a drive shaft rotatably carried by said bearings to have a power receiving end at the exterior of the shell and a portion within the shell spaced from and normal to the axis of the shell, said shell and drive shaft being stationary, disc-shaped heads engaged with and closing the ends of the shell, circumferentially spaced fasteners releasably securing the heads to the ends of the shell in selective rotative positions relative to the shell, bearings carried by the heads concentric with the axis of the shell, a driven shaft rotatably carried by the last mentioned bearings with a portion extending centrally through the shell and a power delivering end portion projecting from the outer side of one head, gear means within the shell operatively connecting the drive and driven shafts, and a pair of mounting legs projecting substantially radially from the peripheral portion of each head.

5. A power transmission of the character described including, an annular shell with round concentric oppositely facing open ends in spaced parallel planes, spaced bearings carried by the peripheral portion of the shell, a drive shaft rotatably carried by said bearings to have a power receiving end at the exterior of the shell and a portion within the shell spaced from and normal to the axis of the shell, said shell and said shaft being stationary, like disc-shaped heads engaged with and closing the ends of the shell, circumferentially spaced fasteners releasably securing the heads to the ends of the shell, bearings carried by the heads concentric with the axis of the shell, a driven shaft rotatably carried by the last mentioned bearings with a portion extending centrally through the shell and a power delivering end portion projecting from the outer side of one head, gear means within the shell operatively connecting the drive and driven shafts, and a pair of mounting legs projecting substantially radially from the peripheral portions of the heads, the said fasteners being spaced around the heads so the heads can be secured to the shell in various rotative positions about the axis of the shell.

6. In combination, a motor stationary on a fixed support and having a power shaft operating on a fixed axis, a gear mechanism spaced from the motor and having a case and drive and driven shafts carried by and projecting from the case, the driven shaft extending normal to the drive shaft, the case having portions variable in position relative to each other, a coupling between the power shaft and drive shaft, supports spaced apart axially of said driven shaft and projecting from portions of the case to be in various positions relative to the motor depending upon the relative positioning of said portions of the case, and feet on each support spaced transversely of said driven shaft.

7. In combination, a motor stationary on a fixed support and having a power shaft operating on a fixed axis, a gear mechanism spaced from the motor and having a case and drive and driven shafts carried by and projecting from the case, the case having a stationary center shell portion carrying the drive shaft and end portions carrying the driven shaft and closing the ends of the shell, the end portions being operatively engageable with the shell portion in various rotative positions relative to the center axis of the driven shaft, a coupling between the power shaft and drive shaft, means releasably securing the end portions to the shell portion in selected rotative relation thereto and supports projecting from said portions of the shell to be in various positions relative to the shell and motor depending upon positioning of the heads.

8. A power transmission of the character described including, an annular shell with round concentric oppositely facing open ends in spaced parallel planes, spaced bearings carried by the peripheral portion of the shell, a drive shaft rotatably carried by said bearings to have a power receiving end at the exterior of the shell and a portion within the shell spaced from and normal to the axis of the shell, said shell and drive shaft being stationary, disc-shaped heads engaged with and closing the ends of the shell, circumferentially spaced fasteners releasably securing the heads to the ends of the shell in selective rotative positions relative to the shell, bearings carried by the heads concentric with the axis of the shell, a driven shaft rotatably carried by the last mentioned bearings with a portion extending centrally through the shell and a power delivering end portion projecting from the outer side on one head, gear means within the shell operatively connecting the drive and driven shafts, and a pair of mounting legs projecting substantially radially from the peripheral portion of each head, each leg having a foot at its end for attachment to a support, the several feet being coplanar and being spaced both longitudinally and transversely of said driven shaft.

HENRY FRANK KAELIN.

(References on following page)

References Cited in the file of this patent

UNITED STATES PATENTS

| Number | Name | Date |
|---|---|---|
| 983,361 | Gray | Feb. 7, 1911 |
| 1,246,930 | Jenny | Nov. 20, 1917 |
| 1,298,653 | Bockshe | Apr. 1, 1919 |
| 1,346,635 | Comstock | July 13, 1920 |
| 1,381,337 | Rippe | June 14, 1921 |
| 1,631,201 | Hewitt et al. | June 7, 1927 |
| 1,697,240 | Hartzell | Jan. 1, 1929 |
| 1,781,083 | Schmick | Nov. 11, 1930 |
| 1,890,685 | Johnson | Dec. 13, 1932 |
| 1,911,666 | Beitz | May 30, 1933 |
| 2,006,172 | Klappauf | June 25, 1935 |
| 2,082,446 | Dunham | June 1, 1937 |
| 2,232,157 | Anton | Feb. 18, 1941 |

FOREIGN PATENTS

| Number | Country | Date |
|---|---|---|
| 387,943 | Great Britain | Feb. 16, 1933 |
| 457,134 | Germany | Mar. 9, 1928 |
| 504,735 | Great Britain | May 1, 1939 |